United States Patent
Paden et al.

(10) Patent No.: US 6,879,126 B2
(45) Date of Patent: Apr. 12, 2005

(54) METHOD AND SYSTEM FOR POSITIONING A MOVABLE BODY IN A MAGNETIC BEARING SYSTEM

(75) Inventors: Brad E. Paden, Goleta, CA (US); Jed C. Ludlow, North Salt Lake, UT (US); Gill B. Bearnson, Salt Lake City, UT (US)

(73) Assignee: MedQuest Products, Inc, Salt Lake City, UT (US)

( * ) Notice: Subject to any disclaimer, the term of this patent is extended or adjusted under 35 U.S.C. 154(b) by 0 days.

(21) Appl. No.: 09/895,881

(22) Filed: Jun. 29, 2001

(65) Prior Publication Data

US 2003/0001445 A1 Jan. 2, 2003

(51) Int. Cl.⁷ .............................................. G05B 11/42
(52) U.S. Cl. ...................... 318/610; 318/609; 318/611; 318/623; 318/632; 310/90.5
(58) Field of Search ................................ 310/166, 90.5; 361/139; 318/609, 610, 611, 623, 632; 417/423.3, 356

(56) References Cited

U.S. PATENT DOCUMENTS

| | | | |
|---|---|---|---|
| 3,860,300 A | 1/1975 | Lyman .......................... 308/10 |
| 4,629,262 A | 12/1986 | Hamilton .................... 310/90.5 |
| 4,683,391 A | 7/1987 | Higuchi ...................... 310/90.5 |
| 4,688,998 A | 8/1987 | Olsen et al. ................. 417/356 |
| 4,806,835 A * | 2/1989 | Habermann ................. 318/607 |
| 4,879,500 A | 11/1989 | Kanemitsu ................... 318/632 |
| 4,999,534 A | 3/1991 | Andrianos .................. 310/90.5 |
| 5,027,280 A * | 6/1991 | Ando et al. ................. 700/174 |
| 5,044,897 A | 9/1991 | Dorman ..................... 417/423.7 |
| 5,055,005 A | 10/1991 | Kletschka ................... 417/356 |
| 5,112,202 A | 5/1992 | Oshima et al. ............. 417/423 |
| 5,140,209 A | 8/1992 | Whorlow .................... 310/90.5 |
| 5,195,877 A | 3/1993 | Kletschka .................. 417/356 |
| 5,302,874 A | 4/1994 | Pinkerton ................... 310/90.5 |
| 5,376,871 A * | 12/1994 | Takara et al. ............... 318/610 |
| 5,470,208 A | 11/1995 | Kletschka .................. 417/356 |
| 5,491,396 A | 2/1996 | Takahashi et al. .......... 318/632 |
| 5,530,306 A * | 6/1996 | Ueyama ..................... 310/90.5 |
| 5,576,587 A | 11/1996 | Takahashi et al. ......... 310/90.5 |
| 5,666,014 A | 9/1997 | Chen ......................... 310/90.5 |
| 5,685,700 A | 11/1997 | Izraelev .................... 417/423.7 |
| 5,777,414 A | 7/1998 | Conrad ..................... 310/90.5 |
| 5,783,885 A | 7/1998 | Post .......................... 310/90.5 |
| 5,840,070 A | 11/1998 | Wampler .................... 604/131 |
| 5,911,558 A | 6/1999 | Nakazeki et al. ........... 415/118 |
| 5,938,412 A | 8/1999 | Izraelev .................... 417/423.7 |
| 5,973,468 A * | 10/1999 | Yamauchi ................... 318/610 |
| 6,015,275 A | 1/2000 | Suzuki et al. ............. 417/423.12 |
| 6,020,665 A * | 2/2000 | Maurio et al. .............. 310/90.5 |
| 6,074,180 A | 6/2000 | Khanwilkar et al. ........ 417/356 |
| 6,121,704 A * | 9/2000 | Fukuyama et al. ......... 310/90.5 |
| 6,215,218 B1 * | 4/2001 | Ueyama ..................... 310/90.5 |
| 6,227,817 B1 * | 5/2001 | Paden ........................ 417/356 |
| 6,244,835 B1 | 6/2001 | Antaki et al. .............. 417/356 |
| 6,259,179 B1 * | 7/2001 | Fukuyama et al. ......... 310/90.5 |
| 6,264,635 B1 * | 7/2001 | Wampler et al. ............ 604/151 |
| 6,394,769 B1 * | 5/2002 | Bearnson et al. .......... 417/423.7 |
| 6,404,088 B1 * | 6/2002 | Barada et al. ............. 310/90.5 |
| 6,447,266 B1 * | 9/2002 | Antaki et al. .............. 417/356 |

FOREIGN PATENT DOCUMENTS

| | | | | |
|---|---|---|---|---|
| EP | 1083348 A1 * | 3/2001 | .......... F16C/32/04 |
| JP | 2001-074049 | * | 3/2001 | .......... F16C/32/04 |
| WO | WO 99/53974 | | 10/1999 | |

* cited by examiner

*Primary Examiner*—David Martin
*Assistant Examiner*—Tyrone Smith
(74) *Attorney, Agent, or Firm*—Madson & Metcalf

(57) ABSTRACT

A magnetic bearing system allows a movable body to be positioned to a point of substantial equilibrium in an axial direction after a system shutdown. A sensor measures the axial position of the movable body to produce an displacement output. That output is then adjusted to account for a sensor offset. The adjustment is stored and can be used to position the movable body during regular operation of the system or when the system reboots or restarts. The adjusted displacement output is converted into a force for positioning the movable body. The movable body may be a rotor in a heart pump apparatus.

63 Claims, 5 Drawing Sheets

METHOD AND SYSTEM FOR POSITIONING A MOVABLE BODY IN A MAGNETIC BEARING SYSTEM

BACKGROUND OF THE INVENTION

1. The Field of the Invention

The present invention relates to a method and system of positioning a movable body in a magnetic bearing system. More specifically, the present invention relates to a method and system of adjusting a sensor output signal, used to measure the position of the body, to account for sensor offset error due to aging, and using the adjusted signal to position the body during regular operation of the system, or to provide a starting position for the body when the system reboots or restarts.

2. The Relevant Technology

Unstable systems such as magnetic bearing systems which support a movable body without a mechanical coupling or bearing are ideally configured for fluid pumps that handle sensitive or corrosive fluids such as blood. Blood for example, can damage mechanical couplings, seals, and other pump parts with which it comes into contact. The mechanical couplings and interacting pump parts, conversely, can damage blood cells. Other fluids need to be free from contamination, mechanical shear, and other problems stemming from fluid interaction with the pump. Many food industry items require special handling to maintain their purity. Still other fluids do not respond well to increases in heat which often accompany many mechanical couplings. Thus, pumps with magnetically suspended rotors have been developed. The rotor may be made of non corrosive material for specific contact with the particular fluid being pumped. The rotor is magnetically suspended in the fluid and coupled to an isolated motor. Because the rotor is levitated actively or passively by a series of permanent or electromagnets, there is no direct mechanical interaction of pump parts to each other. The only moving part that the fluid interacts with is the rotor itself. This configuration minimizes many of the problems associated with fluid interaction with the mechanical parts of the pump.

Magnetic bearing systems, are often unstable however. Forces due to gravitation, fluid flow, vacuums, and the magnets themselves affect the position of the rotor during pumping operation. In a magnetic bearing pump, for example, if a rotor is too far out of position, not only could it adversely affect the operation of the pump, but the rotor could be overcome by one or more of the magnetic fields supporting it, causing the rotor to clamp down against a magnet preventing the pump from operating at all.

Accordingly, some magnetic bearing systems have means to detect the position of the movable body being magnetically suspended and provide a self adjusting mechanism for repositioning the movable body. One such system is the subject of U.S. Pat. No. 3,860,300, which discloses a permanent and electromagnet system. The electromagnets are used for control purposes. A persisting net force produces electrical energization of the electromagnet system resulting from displacement of the movable body. The net force is augmented until the movable body is repositioned to an oppositely displaced position of substantial equilibrium. Another self-adjusting system is disclosed in U.S. Pat. No. 5,783,8855 which discloses a self-adjusting magnetic bearing system which automatically adjusts the parameters of an axially unstable magnetic bearing such that its force balance is maintained near the point of unstable equilibrium.

The problem with many known self-adjusting magnetic bearing systems, however, is that they are sensor-based and do not account for aging or damaged sensors that may drift over time. Electrical sensors, for example, may not take the same reading for the same position of a suspended movable body as they may have when they were newer. Thus, the system may respond and react to adjust a movable position that the system determines is at a certain point, relative to a point of equilibrium, when in fact, the rotor is slightly offset from that particular portion. This phenomenon is often referred to as "sensor drift." Sensor drift may be caused by aging, temperature variations, jarring, misalignment or other factors.

Known self-adjusting systems use output from sensors to reposition the suspended movable body. If the output is incorrect by some amount of sensor offset, a position controller may have to work too hard to reposition the movable body. This may result in damaging excess heat created by the over-worked positioner or controller. Further, it may require excess energy to reposition the movable body because of the sensor offset error caused by sensor drift. In mechanical bearing systems such as heart pumps, which are quite small and house very small batteries, excessive energy drains can significantly reduce the life of the pump.

Perhaps the most severe disadvantage of known self-adjusting magnetic bearing systems is that they do not account for sensor offsets or errors, due to sensor drift or other factors, in the event that they have to reboot or restart. Reboots or restarts may be necessary when the battery loses its power or a computer malfunction occurs. Some magnetic bearing systems come with factory sensor output settings, but sensors drift over time and the factory sensors may not be adequate for reboots or restarts after a period of time. Some positioners or controllers include certain limits to improve or account for transient response. If the sensor offset is not accounted for in the sensor reading output, it is possible that the controller cannot compensate for the offset upon reboot or restart. The result would be a large power dissipation or even failure of the movable body or rotor to levitate. This problem could be fatal in magnetic bearing systems such as heart pumps, residing in people with weak hearts.

Thus, it would be an advancement in the art to provide a magnetic bearing system and method for positioning a movable body that accounts for sensor offset or error, due to sensor drift or other factors. It would be an additional advancement in the art to provide such a system and method that could adjust a sensor output to account for sensor offset to ease the burden on magnetic bearing system positioner or position controller. It would be an additional advancement in the art to provide such a system and method that could store an estimated sensor offset adjustment and use the stored estimate or adjustment to position the movable body in the event of a restart or reboot. Such a system and method in accordance with the present invention is disclosed and claimed herein.

SUMMARY OF THE INVENTION

The apparatus of the present invention has been developed in response to the present state of the art, and in particular, in response to the problems and needs in the art that have not yet been fully solved by currently available magnetic bearing systems. The present invention solves many or all of the foregoing problems by introducing a system and method by which a magnetic bearing system can adjust for sensor offset when positioning a magnetically suspended movable body and use the adjustment during regular operation and in a reboot or restart situation.

In accordance with the invention as embodied and broadly described herein a magnetic bearing system is provided. The magnetic bearing system may include a sensor for measuring the displacement of the movable body and providing a displacement output. In one embodiment, the sensor is configured to convert the displacement output to a displacement voltage, thus making it easier to adjust.

The displacement output or voltage may be used by a sensor offset compensation module to adjust the displacement output to account for a sensor offset. This may be done by estimating the amount of sensor offset and adjusting the displacement output or voltage by the estimate. The sensor offset may be estimated by taking and storing a number of displacement outputs over a period of time and averaging the displacement outputs to approximate the amount of sensor offset in the displacement output. In one embodiment, stored displacement outputs are selectively used depending upon a comparison of the displacement output against a threshold. In other embodiments, a weighted average or moving average may be used to estimate the amount of sensor offset for adjustment purposes.

Nonvolatile memory may be used to store displacement outputs repeatedly taken by the sensor. Executable programs may be stored in nonvolatile memory or other memory storage devices to perform the estimation algorithms and to control the functioning of the system. Memory by also be used to store updated sensor offset estimates or adjusted displacement outputs.

A position control module may be configured to receive and use the adjusted displacement output of the sensor offset compensation module to approximate the point of substantial axial equilibrium of the movable body. In one embodiment, the position control module is a virtual zero power controller. The position control module may be equipped to receive stored estimates of the sensor offset or stored adjusted displacement output for use during a restart, reset or reboot of the system.

An actuator module or actuator uses the output of the position control module to create mechanical or electrical force for positioning the movable body to the point of substantial axial equilibrium determined by the position control module.

In one embodiment, the magnetic bearing system is a heart pump apparatus which has a housing for receiving and discharging blood fluid. The rotor is positioned within the housing between an inlet port and outlet port. Permanent magnets are positioned to control the radial position of the rotor, and the pitch and yaw of the rotor. An electromagnet actively controls the position of the rotor in the axial direction. The heart pump may include an electromagnetic motor for rotating the rotor about a central axis.

Accordingly, the present invention provides a magnetic bearing system and method for positioning a movable body that accounts for sensor offset or sensor error. The present invention also provides a system and method for storing an estimated sensor offset or adjusted displacement output and using the stored estimate to position the movable body during regular use, or in the event of a restart, reboot or other type of reset. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EMBODIMENTS

Figure 1:
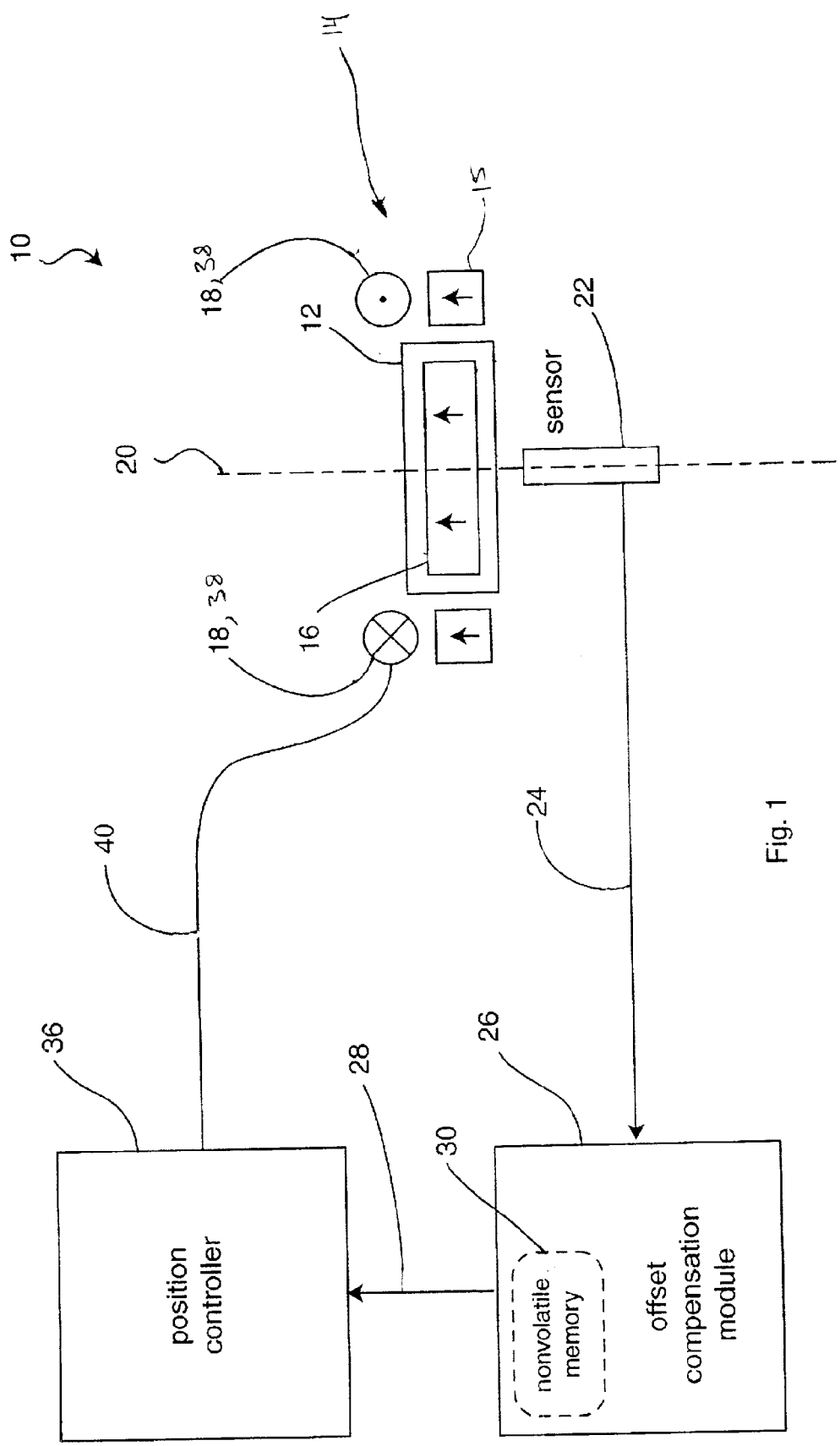
FIG. 1 is a block diagram view of a movable body suspended in a magnetic bearing system according to the present invention.

Certain embodiments of a system in accordance with the invention are now described with reference to the FIGS. 1–5, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the FIGS. 1–5, is not intended to limit the scope of the invention, as claimed, but is merely representative of present embodiments of the invention.

Various components of the invention are described herein as "modules." In various embodiments, the modules maybe implemented as software, hardware, firmware, electronic circuits, or any combination thereof. For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, procedure, function, or the like.

Nevertheless, the identified modules need not be located together, but may comprise disparate instructions stored in different locations, which together implement the described functionality of the module. Indeed, a module may comprise a single instruction, or many instructions, and may even be distributed over several different code segments, among different programs, and across several memory devices.

As used herein, the term executable code, or merely "executable," is intended to include any type of computer instruction and computer executable code that may be located within a memory device and/or transmitted as electronic signals over a system bus, electronic circuit, or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure to be used, produced, or operated on during execution of an executable. The operational data may be collected as a single data set, or may be distributed over different locations including over different storage devices, and may at least partially exist merely as electronic signals on a system bus, electronic circuit, or network.

With particular reference to FIG. 1, a magnetic bearing system is generally designated at 10. The system 10 includes a movable body 12 suspended by a magnetic bearing system 14. The magnetic bearing system 14 may include actively controlled magnets or passively controlled magnets. In one embodiment, permanent magnets 15 and 16 cooperate with each other and with an electromagnet 18 to suspend the movable body 12. The moveable body 12 may contain an annular permanent magnet 16 acting as an inner race which interacts with the permanent magnet 15, acting as an outer race, to suspend the moveable body 12. The permanent magnets are employed to carry all static loads including those due to gravity. An electromagnet 18 also known as a coil, serves to stabilize the moveable body 12. The magnetic bearing system and the moveable body are axis symmetric about an axial direction axis 20. The permanent magnets are employed to carry all static loads. The electromagnets are used for controlling the position of the body in the axial direction 20.

The system 10 includes a sensor 22 for measuring the displacement of the movable body 12 and providing a displacement output 24. The sensor 22 may be configured to convert the displacement output 24, which in one embodiment is measured in millimeters, into a voltage. It will be appreciated that in electromagnetic systems, voltages may be easier to adjust and use to position the movable body 12. The sensor 22 may operate according to optical, induction or capacitance principles to determine the position of the movable body 12.

The system 10 also includes a sensor offset compensation module 26 which is configured to receive the displacement output 24 from the sensor 22. It will be appreciated by those of skill in the art that over time, the sensor may develop a sensor offset, which becomes a property of the displacement output 24. The sensor offset compensation module 26 is configured to adjust the displacement output 24 to account for the sensor offset. The sensor offset compensation module 26 provides an estimated sensor offset and adjusts the displacement output 24 by the estimated sensor offset to create an adjusted displacement output 28. The sensor offset compensation module 26 maybe configured to store a plurality of displacement outputs 24 repeatedly measured over a period of time. The repeated measurements may be taken of the movable body 12 as part of an ongoing offset estimation process.

In one embodiment, the sensor offset compensation module 26 selectively stores a displacement output 24 by comparing a variance of the displacement outputs against a predetermined threshold to determine a start time and an end time for storing the displacement offsets. If there is a lot of variance in the displacement outputs, the offset compensation module 26 may wait until there is less variance to store displacement outputs 24. In this way, only displacement outputs 24 that reflect steady state conditions are stored. In another embodiment, all displacement outputs 24 may be stored, but only a selective plurality of displacement outputs 24 are used to estimate the sensor offset. The displacement outputs 24 are selected for use by comparing a magnitude of each displacement output 24 against a predetermined threshold. Displacement outputs 24 that are unusually high or low may not be used, thus increasing the accuracy of the sensor offset estimate.

The sensor offset compensation module 26 estimates the sensor offset by taking an average value of the stored displacement outputs 24. In one embodiment, the sensor offset compensation module 26 takes a weighted average by weighting certain displacement outputs 24 depending on the variance of the outputs in a similar segment of time. The sensor 22 may take continual measurements and provide multiple displacement outputs 24. The offset compensation module 26 may take a moving average of a predetermined number of displacement outputs 24 by continually averaging the last predetermined number of stored displacement outputs 24. For example, if the predetermined number of stored displacement outputs 24 is twenty, when the twenty-first displacement output 24 is input into the offset compensation module 26, the first displacement output 24 maybe dropped and displacement outputs two through twenty-one may be used to take the average. In another embodiment, the sensor offset compensation module 26 estimates the sensor offset by determining a median value of the stored displacement outputs 24. In yet another embodiment, the sensor offset compensation module 26 estimates the sensor offset by determining the mode value of the stored displacement outputs 24. As will be discussed in greater detail below, because the movable body 12 is suspended near equilibrium, the magnitude of the displacement output is close to the amount of sensor offset. Accordingly, averaging the displacement outputs 24 provides a good estimate of the sensor offset. It will be appreciated by those of skill in the art that other algorithms may be used to approximate the sensor offset.

Displacement outputs 24 maybe stored in nonvolatile memory 30. The memory 30 may also be part of a CPU or computer and may store executable files for driving the system and running various modules or algorithms. In this configuration, various bus lines or other communication paths (not shown) may be used to communicate between the memory 30 and each of the various modules in the system 10. Input and output into the memory 30 may be facilitated by a digital-to-analog or analog-to-digital converters. In another embodiment, each module, may store its own executable files. In the embodiment of FIG. 1, the system 10 may include analog to digital and digital to analog converters to facilitate interaction between various digital and analog components of the modules. The memory 30 may also store adjusted displacement outputs 28 or estimated sensor outputs. The adjusted displacement outputs 28 or estimated sensor outputs may be recalled from the memory 30 and used to position the movable body 12 to a point of substantial axial equilibrium during a reset, reboot, restart, or similar power up of the system 10. In one embodiment, an initial estimated sensor offset may be stored in the memory 30 during assembly of the system 10.

The system 10 may also include a position control module 36 which receives and uses the adjusted displacement output 28 of the sensor offset compensation module 26 to approximate a point of substantial axial equilibrium of the movable body 12. In one embodiment, the position controller module 36 is a virtual zero power controller, or "VZP." Any of a known variety of VZP controllers may be used. All VZP controllers are characterized by a small output in response to low frequency sinusoidal inputs. Linear VZP controllers typically have a transfer function of zero at zero.

An actuator module or actuator 38, may covert an output 40 of the position control module 36 into a force for positioning the movable body 12 to the point of substantial axial equilibrium in the magnetic bearing system. In one embodiment, the actuator module 38 is the electromagnet 18 which provides an electromagnetic force to position the movable body 12 to the point of substantial axial equilibrium. The actuator module 38 may include an amplifier. It will be appreciated by those of skill in the art that in alternative embodiments, the force created by the actuator may be an electrostatic force, a fluid force, a contact force, a mechanical force or other force to position the movable body 12. The position controller may include an amplifier when the output 40 is a high power signal.

Figure 2:
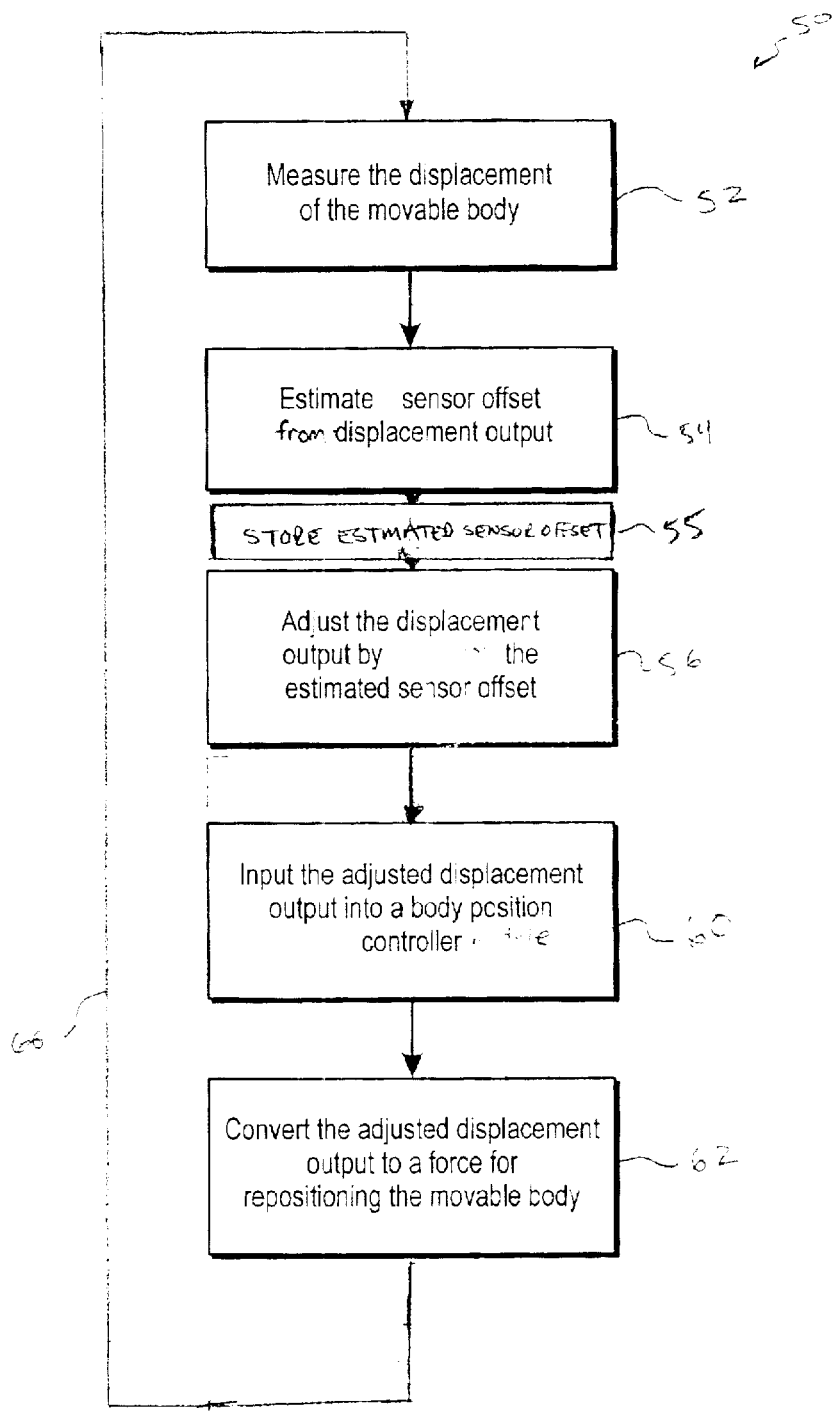
FIG. 2 is a flow chart of a method of positioning a suspended movable body according to the present invention.

Referring now to FIG. 2, a flowchart 50 for a method of positioning a movable body 12 suspended in a magnetic bearing system having a displacement sensor 22 is shown. The method may include measuring 52 the axial position of the movable body 12 with the sensor 22 to produce a displacement output 24. In one embodiment, the measurement is taken of the movable body 12 when it is suspended, or in a levitating position. A sensor offset in the displacement output 24 is estimated 54. The estimated sensor offset is stored in nonvolatile memory. The displacement output 24 is adjusted 56 for a sensor offset using the estimated displacement output. The adjusted displacement output may then be input 60 into a position controller and converted 62 to a force for positioning the movable body 12. The movable body 12 may then be positioned 64 with the force and the process is repeated 66.

Estimating 54 the sensor offset includes storing a plurality of displacement outputs 24 over a period of time. The period of time may be determined by comparing a variance of the plurality of displacement outputs 24 against a predetermined threshold to determine a start time and an end time. The threshold may be set such that if the displacement outputs 24 are varying more than is desired, the storing of displacement outputs may not yet start, or if already started, may temporarily end until displacement outputs within the predetermined variance range are measured. Alternatively, all displacement outputs 24 may be stored and selective displacement outputs 24 may be used for the estimating 54 the sensor offset, according to how the measured displacement output 24 compare to a predetermined threshold. In one embodiment, estimating 54 the sensor offset includes taking an average value of stored displacement outputs 24. The sensor offset may also be estimated 54 by taking a moving or continual average of a predetermined number of stored displacement outputs 24. This may be done by averaging a preselected number or set of displacement outputs 24 each time a new displacement output 24 is added to the set and the oldest measured displacement output 24 is dropped from the set. The sensor offset may be estimated 54 by a weighted average where displacement output 24 values are scaled according to a predetermined formula. For example, displacement output 24 that barely fall within the acceptable range of outputs may be given less weight than those displacement output 24 which are solidly within the predetermined range of acceptable displacement outputs. It will be appreciated by those of skill in the art that a variety of ways may be employed to estimate the sensor offset in the displacement output 24 value. These may include using a median value of the stored displacement outputs 24 or a mode value of the stored displacement outputs 24.

In an alternative embodiment, a latest displacement output may be adjusted 56 by the estimated sensor offset and stored in nonvolatile memory 30. It will be appreciated that in practice, forces are continually acting on the movable body 12 and the measured position or displacement of the movable body 12 may be different with each measurement 52. Additionally, the sensor offset may ebb and flow as the sensor drift phenomenon slowly affects the sensor reading. Storing 55 the latest estimate used to adjust the displacement output 24, or the latest adjusted displacement output 28 in nonvolatile memory 30 allows the latest, and presumably the best correction or adjustment to be used to account for a sensor offset in the sensor reading to be used in a restart, reboot, or reset situation.

Inputting 60 the adjusted displacement output 28 into a body position controller module 36 for determining how best to position the movable body 12 to a point of substantial axial equilibrium may include recalling the stored adjusted displacement output 28 and/or estimated sensor offset.

Converting 62 the adjusted displacement output to a force for positioning the movable body may include mechanically creating a force to substantially position the movable body at the point of substantial axial equilibrium. In one embodiment, as discussed in more detail below, converting 62 the adjusted displacement output to a force for positioning 64 the movable body 12 comprises electronically creating a force to position the movable body at the point of substantial axial equilibrium.

Figure 3:
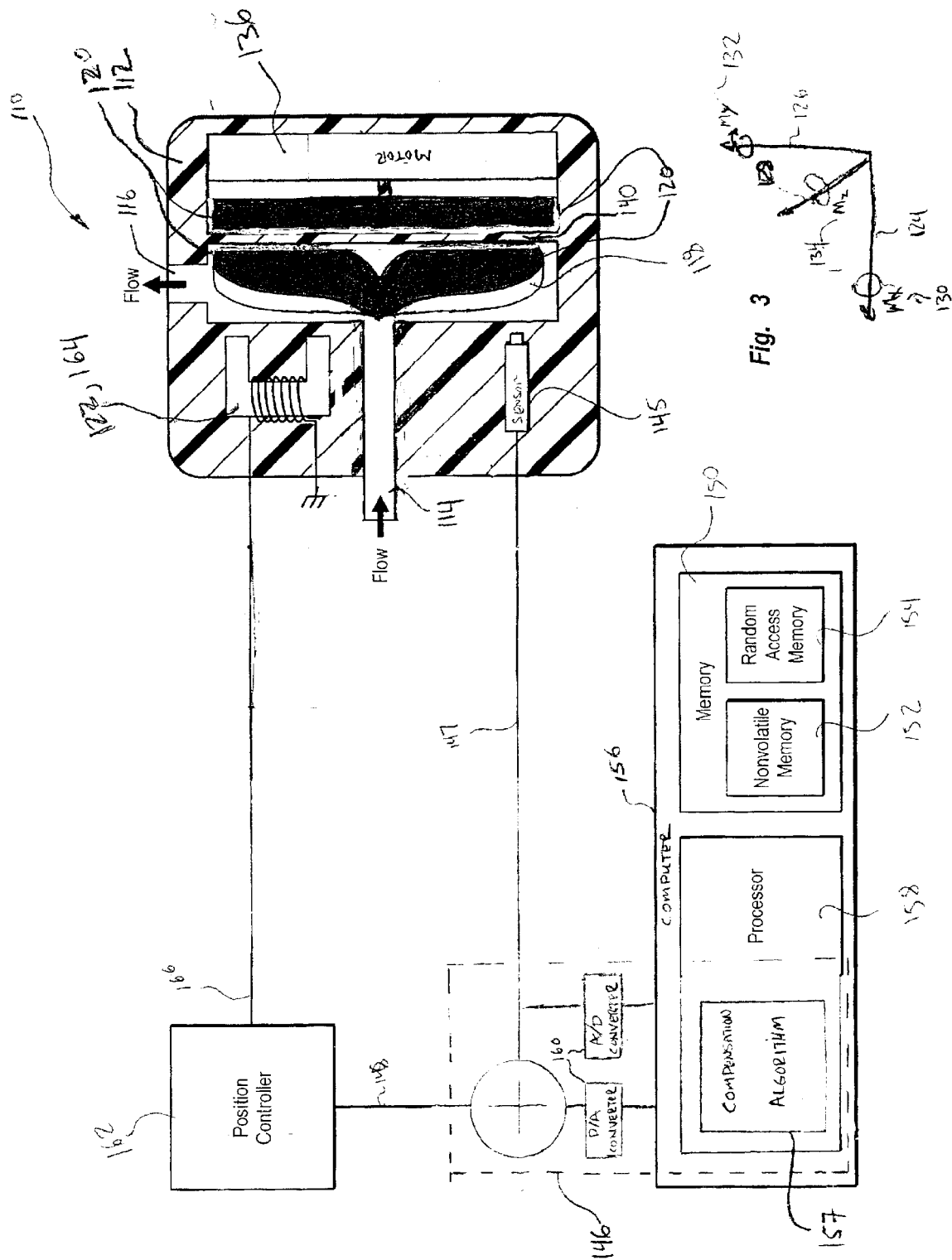
FIG. 3 is a block diagram of a magnetically suspended pump apparatus.

Referring now to FIG. 3, the magnetic bearing system in one embodiment of the present invention, is a pump 110. This magnetically suspended pump or pump apparatus includes a housing 112 having an inlet port 114 for receiving fluid and an outlet port 116 for discharging fluid. A rotor 118 is positioned within the housing 112 for pumping blood or fluid between the inlet port 114 and the outlet port 116. The system 110 also includes a plurality of permanent magnets 120 for passively controlling the position of the rotor radially, and the pitch and yaw of the rotor. An electromagnet 122 actively controls the position of the rotor in the axial direction. The permanent magnets 120 are employed to carry all static loads. The electromagnets 122 are used for controlling the position of the rotor 118 in a particular direction. It will be appreciated that support of the rotor 118 requires control of six degrees of freedom: three translations long the x-axis 124, y-axis 126, and z-axis 128, and three rotational displacements about those axis $M_x$, 130, $M_y$, 132, and $M_z$ 134. In the illustrated embodiment, the electromagnet 122 controls the axial direction of the rotor 118, or movement along the x-axis 124.

The rotational displacement $M_x$ 130 of the rotor 118 about a central axis 124 is driven by a motor 136 magnetically coupled to the rotor 118 through a partition 140. The motor 136 may be an electromagnetic motor or servo motor connected to a power source which may include a battery (not shown). Motor-driven, magnetically suspended rotors in a housing with inlet ports and outlet ports are known in the art and the axial and other suspension dynamics of the rotor may be configured in a number of ways to practice the teachings of this invention with different translational or rotational being actively or passively controlled. One such suitable configuration of magnetic bearings in a pump configuration to which the teachings of this invention can be applied is the HeartQuest™ heart pump manufactured by MedQuest Products, Inc.

The pump 110 may also include a sensor 145 for measuring the axial displacement of the rotor 18 and producing a displacement output 147. In one embodiment the rotor 118 is measured in a suspended or levitating position. The sensor 145 may be configured to convert the displacement output 147 from a measure of distance into a voltage. It will be appreciated that minor corrections to the position of the rotor 118 are done by the electromagnet 122 which can alter the position of the rotor 118 by changing the voltage or current in coils of the electromagnet 122. The rotor 118 position may be measured while it is levitating. In one alternative embodiment, measurements may be taken of the displacement of the rotor in a plurality of levitating or non-levitating positions to produce a plurality of displacement outputs. These outputs may then be used to estimate a sensor offset.

An offset compensation module 146 adjusts the output 147 of the sensor 145 to account for sensor offset. The offset compensation module 146 estimates a sensor offset and adjusts the displacement output 147 by the estimated sensor offset to create an adjusted displacement output 148. As discussed in greater detail below, the estimation of the sensor offset may be made by a compensation algorithm 157 which averages a plurality of stored displacement outputs 147 contained in the system 110 from the factory or stored with each measurement of the rotor 118 position. The system 110 is configured to repeatedly take rotor 118 position measurements and make modifications or adjustments to the rotor 118 position.

In one embodiment, the offset compensation module 146 compares a variance of the plurality of displacement outputs 147 against a predetermined threshold to determine a start time and an end time for taking measurements. As discussed above, if there is a lot of variance in the displacement outputs, the offset compensation module 146 may wait until there is less variance to store displacement outputs 147. In this way, only displacement outputs 147 that are within a certain range are stored. In another embodiment, all displacement outputs 147 may be stored, but only a selective plurality of displacement outputs 147 are used to estimate the sensor offset. The sensor offset compensation module 146 may estimate the sensor offset in a number of ways, including taking an average of one or more different displacement outputs 147, taking a weighted or a moving average of one or more displacement outputs 147, or determining the median or mode value of one or more displacement outputs 147.

A most recent adjusted displacement output 148 or estimated sensor offset maybe stored in memory 150. The memory 150 may include nonvolatile memory 152, random access memory 154, or other types of memory or storage devices, including, but not limited to, read only memory. Individual offset estimates may also be stored in memory 150, as well as displacement outputs 147 or other data used to derive an estimate of the sensor offset. It will also be appreciated that each module may include its own memory where executable files are stored for controlling the operation of a particular module.

In practice, forces are continually acting on the rotor 118 and the measured position or displacement of the rotor 118 may be different with each measurement by the sensor 145. Additionally, the sensor offset may ebb and flow as the sensor drift phenomenon slowly affects the sensor reading. Storing a latest adjusted displacement output 147 in nonvolatile memory 150 allows the latest, and presumably the best correction or adjustment to be used or recalled to account for a sensor offset in the displacement output 147 when restarting, reboot, resetting, or otherwise powering up the system.

The memory 150 maybe part of a computer 156 which may include a processor 158 for controlling the function of the system 110 and/or one or more modules or executable files in the system 110. It will be appreciated by those of skill in the art that output 147 from the sensor module or other modules to the computer and from the computer to one or more modules may require an analog-to-digital or digital-to-analog interface 160. It will also be appreciated by those of skill in the art that the computer 156 and modules may be contained within the housing 112.

The offset compensation module 146 may input the adjusted displacement output 148 into a rotor position controller 162 configured to determine the point of substantial axial equilibrium of the rotor 118. In one embodiment, the rotor position controller 162 is a virtual zero power controller or VZP controller 162. The VZP Controller 162 receives the adjusted displacement output 148 and stabilizes the rotor 118 within the housing 112. The VZP Controller and has low or zero gain at direct current. By adjusting the displacement output 147, the measure of rotor 118 position is close to equilibrium in the axial direction. Accordingly, the VZP Controller 162 does not have to work as hard to determine where the equilibrium position is.

An actuator module or actuator 164 uses the output 166 from the VZP Controller 162 to create a force for positioning the rotor 118. In one embodiment, the actuator 164 is the electromagnet 122 and the force is a electronically created or is an electromagnetic force. The rotor 118 maybe positioned by adjusting the voltage to the electromagnet 122 to create a stronger or weaker electronic field. The actuator 164 or position controller 162 may also include a current amplifier. It will be appreciated by those of skill in the art that in alternative embodiments, the force created by the actuator may be an electrostatic force, a fluid force, a contact force, a mechanical force or other force to position the movable body 12. For example the actuator 164 may create a force by moving a plunger (not shown) near the rotor 118.

There are several forces which act upon the rotor 118. These may include fluid forces, gravitational forces, and dynamic forces. The fluid forces are due to fluid pressures acting on the rotor and fluid passes from the inlet port 114 to the outlet port 116 and the changes in momentum as the flow direction is changed. The gravitational forces are due to the difference between the weight of the rotor 118 and the buoyant force, in the fluid, acting on the rotor 118 in different orientations. Dynamic forces may act upon the rotor 118 in a situation where the pump 110 is in human body and can experience sudden motions, impact after a fall, periods of intense exercise causing changes in blood pressure, and the like.

Figure 4:
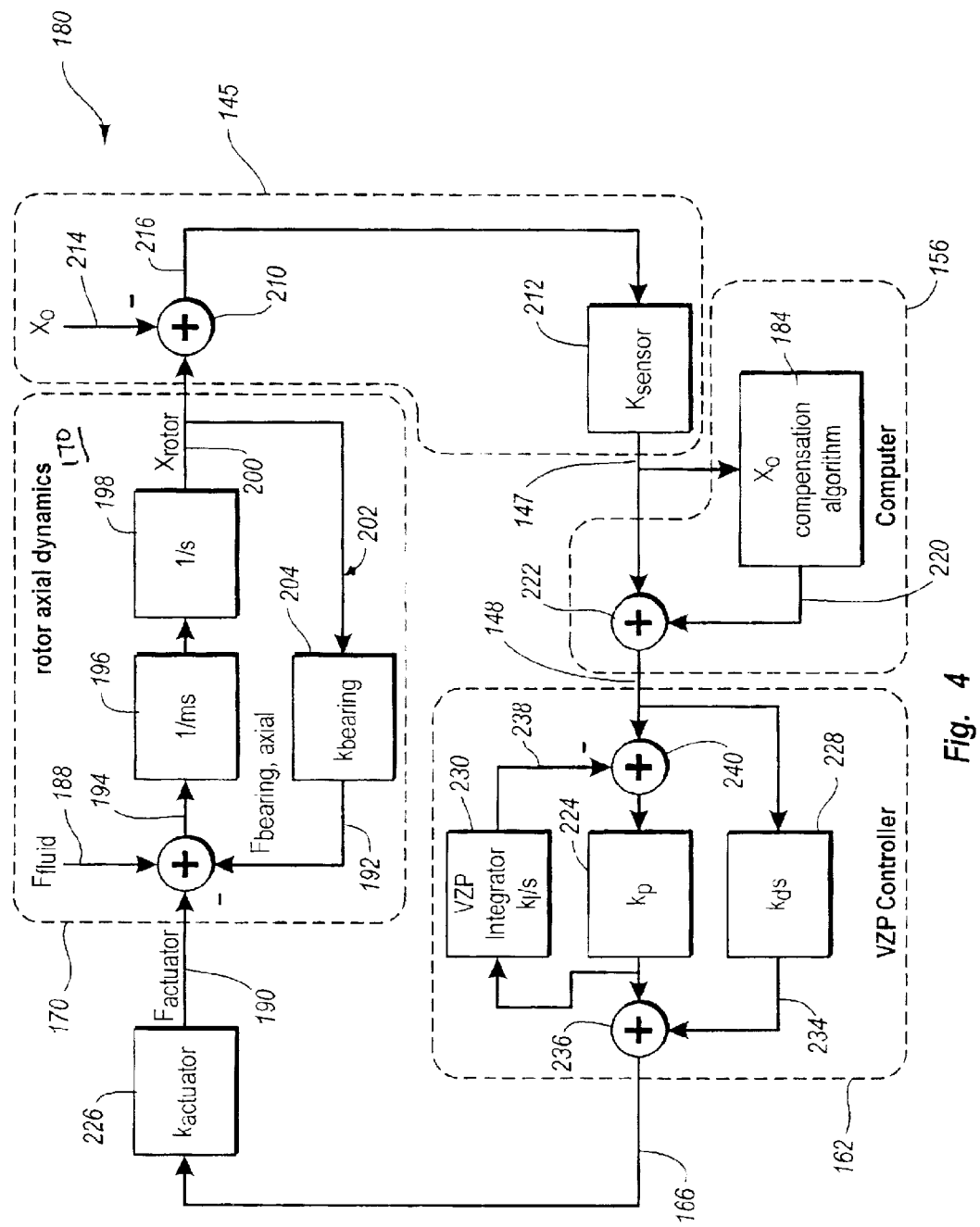
FIG. 4 is a block diagram of the magnetically suspended pump apparatus of FIG. 3.

Referring now to FIG. 4, a block diagram of a circuit 180 of the pump 110 (FIG. 3) of present invention is shown. The circuit 180 illustrates the rotor axial dynamics 170 of the pump 110. The sensor 145, virtual zero power (VZP) controller 162, and the actuator 164 are also illustrated. The circuit may also interact with the computer 156, which in one embodiment, includes a compensation algorithm 184.

The VZP controller helps balance the forces acting on the rotor 118 (FIG. 3). These forces may include a fluid force $F_{fluid}$ 188, an actuator force $F_{actuator}$ 190 generated by the actuator 164, and a force due to the magnetic bearings in the axial direction $F_{bearing,axial}$ 192. These forces combine to produce a net force 194 on the rotor 118 in the axial direction. The 1/ms block 196 combined with the 1/s block 198 illustrate the rotor mass dynamics under Newton's law, where (m=the mass of the rotor 118) and (s=the laplace transform variable). The blocks 196 and 198 combine to output the position 200 of the rotor in the axial direction relative to the axial equilibrium point of the magnetic bearings, or $X_{rotor}$ 200. A feedback loop 202 inputs into the $K_{bearing}$ box 204, where $K_{bearing}$ is the axial stiffness of the permanent magnet bearings acting on the position $X_{rotor}$ 200 of the rotor 118 in the axial direction.

The sensor 145 is illustrated at the circuit level in FIG. 4 as a summation block 210 in combination with a $K_{sensor}$ block 212, where $K_{sensor}$ or is the sensor 145 gain. The summation block 210 combines the axial position of the rotor, $X_{rotor}$ 200, with the sensor zero position 214, or $X_0$, the position of the rotor 118 where the sensor reading is zero. By way of illustrative example, if $X_{rotor}$ 200 were equal to $X_0$ 214, the output 216 of the summation block 210 would be zero. $X_0$ 214 is the offset of the sensor's "zero position," which is a virtual place in space relative to the zero mechanical position of the rotor 118 where the rotor 118 is in unstable equilibrium. Accordingly, $X_0$ 214 is a property of the sensor 145, not a reading from the sensor 145.

The $K_{sensor}$ block 212, compares the rotor position $X_{rotor}$ 200 to the sensor zero position $X_0$ 214, and multiplies that by a conversion factor that outputs a voltage. The $K_{sensor}$ block 212 converts the output 216 of the summation block 210 into the units, volts per meter. Thus, in one embodiment, the displacement output 147 of the sensor 145 may be viewed as linear according to the formula $$y = kx + b,$$

where "x" in the formula is the input to the sensor 145, which is the position $X_{rotor}$ 200 of the rotor 118. "Y" in the formula represents the displacement output 147 of the sensor 145. "b" may represent $X_{rotor}$ 200 combined with the sensor offset represented by $X_0$ 214. The scale factor "k" in the formula is represented by the $K_{sensor}$ block 212.

The compensation algorithm 184 compensates or adjusts for the sensor offset $X_0$ 214 in the rotor position $X_{rotor}$ 200. The compensation algorithm 184 receives the displacement output 147 from the sensor 145 and as discussed in more detail below, uses it to estimate an adjustment to compensate for the sensor offset $X_0$ 214 in the rotor position $X_{rotor}$ 200. The estimate 220 output from the compensation algorithm 184 is combined with the sensor reading or displacement output 147 at the summing junction 222.

Measurements of the rotor position $X_{rotor}$ 200 are repeatedly taken over a period of time and used to continuously compensate for the sensor offset $X_0$ 214 in the rotor position $X_{rotor}$ 200. The measurements may be taken with the rotor 118 in a levitated state. These compensations or adjusted displacement outputs 148 are used by the VZP controller 162 during regular operation to adjust the position $X_{rotor}$ 200 of the rotor 118. They may also be stored, along with sensor offset estimates 220, or displacement outputs 147. In the event that the power source fails or the system freezes up and needs to reboot, reset, or otherwise restart, a most recent adjusted displacement output 148, sensor offset estimate 220, or displacement output 147, which incorporates the most recent sensor offset $X_0$ 214, is available for input into the VZP Controller 162.

It will be appreciated by those of skill in the art that the VZP controller gains are selected such that the pump rotor 118 is actively levitated in the axial direction. The VZP Controller 162 can be designed by experiment, pole-placement design, or other methods known to those skilled in the art of controller design. Other control objectives such as transient performance and vibration suppression may also be used in the design. One feature of the VZP controller 162 is its low amplification of low-frequency sensor signals and its stabilization of the rotor 118 in the levitated position. In the embodiment of FIG. 4, the controller 162 is configured such that the response to a constant input is zero after transients decay away.

The $K_p$ block 224 of the VZP Controller takes into account the destabilizing force caused by the $K_{bearing}$ box 204. The $K_p$ block 224 acts like spring to reign in the forward or other displacement of the rotor 118 which will adjust the current into a $K_{actuator}$ block 226 to produce a force that pulls the rotor 118 back into equilibrium.

The $K_dS$ block 228 takes into account the velocity of the rotor 118 as is reacts to forces acting on it in the axial direction. The $K_dS$ block 228 acts as a shock absorber or a damper. If there is a velocity in the forward or other direction, then the $K_dS$ block 228 communicates with the $K_{actuator}$ block 226 to provide a suitable correcting force.

The $K_I/S$ block 230 is an integrator that looks at the output 232 of the $K_p$ block 224 to determine if a relatively constant current is being applied. An output 238 of the $K_I/S$ block 230 is added to the input of 148 of the VZP Controller 162. If the output 232 of the $K_p$ block 224 creates a continual demand for current change, the actuator 164 is going to get hot and it can be assumed that there is an error in what the VZP Controller 162 has determined is the equilibrium point of the rotor position $X_{rotor}$ 200 to be. Accordingly, the $K_I/S$ block 230 performs a function like an auto load leveler. The $K_I/S$ block 230 affects a change in the equilibrium point of the rotor 118. Once the $K_I/S$ block 230 determines that the output 232 of the $K_p$ block 224 is a substantially constant current, the $K_p$ block 224 output 232 and an output 234 from the $K_dS$ block 228 are combined at the summing junction 236 to provide an input 166 to the $K_{actuator}$ block 226.

For purposes of illustration, assume that the rotor 118 is in equilibrium and $F_{fluid}$ 188 is zero. It follows that the axial bearing force, $F_{bearing,axial}$ 192 is also zero. If this were not true, the rotor 118 would not be in substantial static equilibrium, since force 194 would be nonzero. Accordingly, with the $F_{fluid}$ 188 at zero, the rotor position $X_{rotor}$ 200 is also at zero, or in other words, the rotor position, $X_{rotor}$ 200, is in the "neutral position" with respect to the permanent magnets (FIG. 3).

Since in the present example, we have set steady-state operation of the rotor position $X_{rotor}$ 200 equal to zero, for purposes of illustration, the input 216 to the $K_{sensor}$ block 212 is minus the sensor offset, $-X_0$, and the output of the $K_{sensor}$ block 212 is $(-K_{sensor} \times X_0)$, where $K_{sensor}$ is the amount of sensor 145 gain. Thus, the steady state output of the sensor 145 provides a "sensor neutral" or zero position relative to the stable neutral position of the rotor 118.

In actual practice, however, the rotor position $X_{rotor}$ 200 is subject to non-zero fluid forces 188 and electronic noise, and the rotor position $X_{rotor}$ 200 only approximates the zero position, or the bearing equilibrium position in operation. Thus, the sensor displacement output 147 can only be used to derive an estimate of the "sensor neutral" position. Using "Xô" to designate an estimate of $X_0$, the "sensor neutral" or zero position, this estimate can be used to adjust the output 147 of the sensor to compensate for the sensor offset error. As will be discussed in greater detail below, this is accomplished by the $X_0$ compensation algorithm 184, by adding $-(K_{sensor} \times Xô)$ to the sensor output 147 at the summing junction 222. Thus, with this compensation, the input to the VZP controller 148 is very close to zero. This is important during a power up, restart, reboot, or other type of reset, so that the VZP controller 162 need not correct for cumulative drift and offset in the sensor 145. Moreover, the VZP integrator will typically include anti-windup features or other limits to improve transient response. If the sensor 145 offset is not corrected, it is possible that the VZP controller 162 cannot compensate for the offset. The result would be large power dissipation in the actuator 164 (FIG. 3) or even failure of the system to levitate the rotor 118 (FIG. 3).

In a heart pump application, for example, the typical behavior of the rotor 118 during operation in the heart pump will be: a) a transient motion during power-up of the device, where the VZP integrator output 238 is set to zero; b) relatively constant position where the $X_{rotor}$ 200 is substantially at zero during rest periods of the person in whom the pump 110 is located, with some superimposed periodic motion due to the beating heart—the VZP integrator 230 is functioning during this period; or c) periods of larger rotor 118 motion in the axial direction during exercise due to body accelerations and larger variations in blood pressure—the VZP integrator is functioning during this period also.

Periods of rest may provide the best sensor or displacement output 147 data with which to estimate the sensor offset. Rest periods can be detected by measuring the variance of the rotor position $X_{rotor}$ 200 and/or the peak-to-peak motion of the rotor position $X_{rotor}$ 200. During rest, the average value of $X_{rotor}$ 200 approximates zero. Setting [0,T] to be an interval of rest where "T" equals a length of rest period, then one way to compute Xô is to average the displacement outputs 147 over [0,T] and use this to adjust the displacement output 147. A minimum T may chosen so that noise is sufficiently averaged to zero and T can be any larger time provided that the person remains in rest. T should not be so long as to prevent updating Xô in response to sensor drift.

It may be the case that the mean value of $F_{fluid}$ 188 adds a bias to the sensor offset estimate Xô. This bias can be made small by using permanent magnet bearings with a large value of $K_{bearing}$. In addition, if the resting blood pressure of the patient in whom the pump is implanted is known, this effect can be compensated by offsetting the estimate Xô by the expected value of $F_{fluid}/K_{bearing}$.

As discussed above, there are alternative ways to estimate a sensor offset, or compensate for the sensor offset. In one alternative embodiment of the present invention, the estimate Xô is computed by a weighted moving average of the displacement output 147, where the weight is inversely related to the displacement output 147 variance or other measure of variability. In another alternative embodiment, a low value for the VZP integrator 130 gain is set so that the integrator 230 itself forms an estimate of the sensor offset. If the integrator output 238 is saved following a failure or other restart sequence, it may serve the same function of adjusting the displacement output 147 by the value of Xô.

Figure 5:
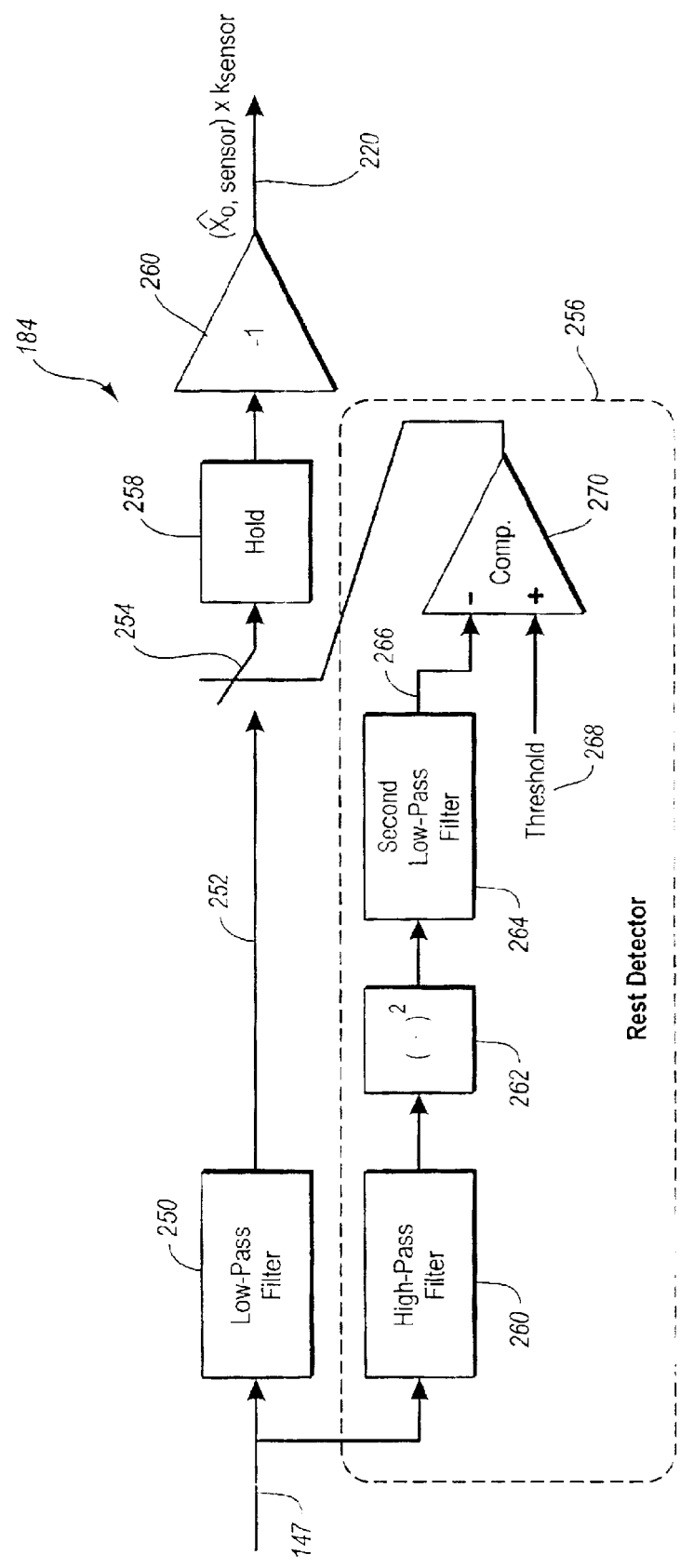
FIG. 5 is a block diagram of the sensor offset compensation algorithm of FIG. 4.

Referring now to FIG. 5, one embodiment of the compensation algorithm 184 is shown. A displacement output 147 is input into a low pass filter 250. The low pass filter 250 may store and average successive displacement outputs 147 input into the low pass filter 250. The may be alternative ways to build a low-pass filter 250. One way is to use a moving average where a predetermined number of successive displacement outputs 147 are input into the low-pass filter and stored. An average is then taken of the last predetermined number of displacement outputs 147. The low-pass filter 250 may store and take a weighted average of displacement outputs 147. The low-pass filter 250 may also store a predetermined number of displacement outputs 147 and determine a mode value or median value. The output 252 may then be sampled by a switch 254 provided that the person in whom the pump is located is at rest as determined by a rest detector 256. The low-pass filter 250 output 252 is stored in a hold 258, inverted at an inverter 260 and output 220 for inputting into the summing junction 222 (FIG. 4).

The rest detector 256 determines periods of time over which the displacement output 147 is relatively stable. Direct current components of the sensor may be filtered out by a high-pass filter 260 and rectified by a squaring device 262. The output 264 of the squaring device is then smoothed by a second low-pass filter 264. If the resulting signal 266 is less than a predetermined threshold 268 a comparator 270 closes the sample switch 254 and the most recent low-pass filter output 252 is stored in the hold 258. If the displacement output 147 is persistently and highly variable, considerable signal energy will pass through the high-pass filter 260 and be rectified in the squaring function 262. Due to the persistence the output of the second low-pass filter 264 will rise above the threshold an inhibit the storage of the low-pass filter output 252 in the hold 258 by opening the switch 254. One feature of the compensation algorithm 184 is that it responds to a nearly constant outputting of displacement outputs 147 by outputting to itself the negative of the constant displacement output. This can be called the "slow inversion property." There are numerous ways to implement algorithms with the slow inversion property and each may be used to practice the teachings of this invention. The switch 254 will also be held open during power interruptions and other event where the approximate mean is not reliable.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method of positioning a movable body suspended in a magnetic bearing system comprising a single displacement sensor, the sensor being an axial displacement sensor, wherein the method comprises the steps of:

measuring the axial position of the movable body with the sensor to produce an axial displacement output;

storing a plurality of axial displacement outputs over a period of time;

adjusting the axial displacement output to account for a sensor offset estimated using stored axial displacement outputs to produce an adjusted axial displacement output;

converting the adjusted axial displacement output to a force for positioning the movable body; and positioning the movable body with said force.

2. The method of claim 1, wherein converting the adjusted axial displacement output to a force comprises inputting the adjusted axial displacement output into a position controller configured to determine the point of substantial axial equilibrium of the movable body.

3. The method of claim 2, wherein converting the adjusted axial displacement output to a force for positioning the movable body comprises creating a mechanical force to position the movable body at the point of substantial axial equilibrium.

4. The method of claim 2, wherein converting the adjusted axial displacement output to a force for positioning the movable body comprises creating an electromagnetic force to position the movable body at the point of substantial axial equilibrium.

5. The method of claim 1, wherein the period of time is determined by comparing a variance of the plurality of axial displacement outputs against a predetermined threshold to determine a start time and an end time.

6. The method of claim 1, wherein a selective plurality of axial displacement outputs are used to estimate the sensor offset, the axial displacement offsets being selected by comparing a magnitude of the axial displacement offset against a predetermined threshold.

7. The method of claim 1, wherein estimating the sensor offset further comprises taking an average value of the stored axial displacement outputs.

8. The method of claim 1, wherein estimating the sensor offset further comprises taking a weighted average value of the stored axial displacement outputs.

9. The method of claim 1, wherein estimating the sensor offset further comprises determining a median value of the stored axial displacement outputs.

10. The method of claim 1, wherein estimating the sensor offset further comprises determining the mode value of the stored axial displacement outputs.

11. The method of claim 1, wherein the magnetic bearing system further comprises memory for storing axial displacement outputs.

12. The method of claim 11, further comprising storing the estimated sensor offset in memory.

13. The method of claim 11, further comprising storing adjusted axial displacement outputs in memory.

14. The method of claim 12, further comprising recalling the estimated sensor offset and utilizing the estimated sensor offset to position the movable body to a point of substantial axial equilibrium.

15. The method of claim 13, further comprising recalling the adjusted axial displacement output and utilizing the adjusted axial displacement output to position the movable body to a point of substantial axial equilibrium.

16. The method of claim 1, wherein measuring comprises measuring the axial position of the movable body when it is levitating.

17. A method of positioning a movable body suspended in a magnetic bearing system comprising a single displacement sensor, the sensor being an axial displacement sensor, wherein the method comprises the steps of:
    measuring the displacement of the movable body with the sensor to produce a displacement output;
    storing a plurality of axial displacement outputs over a period of time;
    estimating a sensor offset using the stored displacement outputs;
    adjusting the displacement output by the estimated sensor offset to create an adjusted displacement output;
    inputting the adjusted displacement output into a body position controller configured to determine the point of substantial axial equilibrium of the movable body;
    converting the adjusted displacement output to an electromagnetic force for positioning the movable body;
    positioning the movable body to a point of substantial axial equilibrium; and repeating the previous steps.

18. The method of claim 17, wherein estimating the sensor offset further comprises storing a plurality of displacement outputs over a period of time, the plurality of displacement outputs being derived from axial position measurements of the movable body.

19. The method of claim 18, wherein the period of time is determined by comparing a variance of the plurality of displacement output against a predetermined threshold to determine a start time and an end time.

20. The method of claim 18, wherein a selective plurality of displacement outputs are used to estimate the sensor offset, the displacement offsets being selected by comparing a magnitude of the displacement offset against a predetermined threshold.

21. The method of claim 18, wherein estimating the sensor offset further comprises taking an average value of the stored displacement outputs.

22. The method of claim 18, wherein estimating the sensor offset further comprises taking a weighted average value of the stored displacement outputs.

23. The method of claim 18, wherein estimating the sensor offset further comprises determining a median value of the stored displacement outputs.

24. The method of claim 18, wherein estimating the sensor offset further comprises determining the mode value of the stored displacement outputs.

25. The method of claim 17, wherein the magnetic bearing system further comprises memory for storing data.

26. The method of claim 25, further comprising storing the estimated sensor offset in memory.

27. The method of claim 26, further comprising recalling the estimated sensor offset and utilizing said offset to position the movable body to a point of substantial axial equilibrium during a reset of the system.

28. The method of claim 18, further comprising storing the adjusted displacement outputs in memory.

29. The method of claim 28, further comprising recalling the adjusted displacement output and utilizing the adjusted displacement output to position the movable body to a point of substantial axial equilibrium.

30. The method of claim 17, wherein measuring comprises measuring the movable body when it is levitating.

31. A system for positioning a movable body suspended in a magnetic bearing apparatus, the system comprising:
    a single displacement sensor for measuring the displacement of the movable body and providing a displacement output, the sensor being an axial displacement sensor;
    a sensor offset compensation module, configured to receive said displacement output from the sensor, record and store a plurality of received displacement outputs over a period of time, and adjust said displacement output to account for a sensor offset estimated from said received displacement outputs, producing an adjusted displacement output;
    a position control module configured to receive and use the adjusted displacement output of the sensor offset compensation module to approximate the point of substantial axial equilibrium of the movable body; and
    an actuator module for converting an output of the position control module into a force for positioning the movable body to the point of substantial axial equilibrium.

32. The system of claim 31, wherein the sensor is configured to convert the displacement output to a displacement voltage.

33. The system of claim 31, wherein the sensor offset compensation module is configured to provide an estimated sensor offset and adjust the displacement output by the estimated sensor offset to create an adjusted displacement output.

34. The system of claim 31, wherein the sensor offset compensation module compares a variance of the plurality of displacement outputs against a predetermined threshold to determine a start time and an end time.

35. The system of claim 31, wherein a selective plurality of displacement outputs are used to estimate the sensor offset, the displacement offsets being selected by comparing a magnitude of the displacement offset against a predetermined threshold.

36. The system of claim 31, wherein the sensor offset compensation module estimates the sensor offset by taking an average value of the stored displacement outputs.

37. The system of claim 31, wherein the sensor offset compensation module estimates the sensor offset by taking a weighted average value of the stored displacement outputs.

38. The system of claim 31, wherein the sensor offset compensation module estimates the sensor offset by determining a median value of the stored displacement outputs.

39. The system of claim 31, wherein the sensor offset compensation module estimates the sensor offset by determining the mode value of the stored displacement outputs.

40. The system of claim 31, wherein the actuator module is configured to convert the output from the position control module to create a mechanical force to position the movable body to the point of substantial axial equilibrium.

41. The system of claim 31, wherein the actuator module is configured to convert the output from the position control module to create an electromagnetic force to position the movable body to the point of substantial axial equilibrium.

42. The system of method of claim 31, wherein the magnetic bearing system further comprises memory for storing data.

43. The system of claim 42, wherein the memory stores an estimated sensor offset in memory.

44. The system of claim 43, wherein the position control module uses the estimated sensor offset stored in memory to position the movable body to a point of substantial axial equilibrium during a reset of the system.

45. The system of claim 42, wherein the memory stores an adjusted displacement output in memory.

46. The system of claim 43, wherein the position control module uses the adjusted displacement output stored in memory to position the movable body to a point of substantial axial equilibrium during a reset of the system.

47. A method of positioning a magnetically suspended rotor in a pump apparatus, the pump apparatus comprising at least one permanent magnet, at least one electro magnet, a single rotor position sensor, the sensor being an axial displacement sensor, and a rotor position controller, comprising:
measuring the displacement of the rotor in the axial direction with the sensor to produce a displacement output;
converting the displacement output into a displacement voltage;
storing a plurality of displacement outputs over a period of time;
estimating a sensor offset using the displacement outputs;
adjusting the displacement output by the estimated sensor offset to create an adjusted displacement output;
inputting the adjusted displacement output into the rotor position controller configured to determine the point of substantial axial equilibrium of the rotor;
converting the output of the rotor position controller into an electromagnetic force;
positioning the rotor to a point of substantial axial equilibrium by adjusting the voltage to the electromagnet; and
repeating the previous steps.

48. The method of claim 47, further comprising storing the estimated sensor offset in memory.

49. The method of claim 48, further comprising recalling the estimated sensor offset and utilizing said offset to position the movable body to a point of substantial axial equilibrium during a reset of the system.

50. The method of claim 47, further comprising storing the adjusted displacement output in memory.

51. The method of claim 50, further comprising recalling the adjusted displacement output and utilizing said offset to position the movable body to a point of substantial axial equilibrium during a reset of the system.

52. The method of claim 47, wherein estimating the sensor offset further comprises averaging a plurality of stored displacement outputs, said plurality of displacement outputs being derived by measuring the displacement of the positioned rotor over a period of time.

53. The method of claim 52, wherein the sensor offset compensation module compares a variance of the plurality of displacement outputs against a predetermined threshold to determine a start time and an end time.

54. The method of claim 53, wherein the sensor offset compensation module estimates the sensor offset by taking an average value of the displacement outputs stored between the start time and the end time.

55. The method of claim 47, wherein a selective plurality of displacement outputs are used to estimate the sensor offset, the displacement offsets being selected by comparing a magnitude of the displacement offset against a predetermined threshold.

56. The method of claim 55, wherein estimating the sensor offset further comprises taking an average value of the stored displacement outputs.

57. The method of claim 47, wherein measuring comprises measuring the axial position of the movable body when it is levitating.

58. A magnetically suspended pump apparatus, comprising:
a housing comprising an inlet port and an outlet port for receiving and discharging fluid respectively;
a rotor positioned within the housing for pumping blood between the housing's inlet port and outlet port;
a plurality of permanent magnets for passively controlling the radial position of the rotor radially, and the pitch and yaw of the rotor;
an electromagnet for actively controlling the position of the rotor in the axial direction;
an electromagnetic motor for rotating the rotor about a central axis;
a sensor for measuring the axial displacement of the rotor;
a computer comprising memory for storing and recalling sensor data;
an offset compensation module for adjusting an output of the sensor to account for sensor offset;
a rotor position controller for positioning the rotor at the point of substantial axial equilibrium; and
an actuator for creating an electromagnetic force to position the rotor.

59. The pump apparatus of claim 58, wherein the computer controls the operation of the pump apparatus.

60. The pump apparatus of claim 58, wherein the computer in configured to recall saved sensor data upon reboot or reset of the computer.

61. The pump apparatus of claim 58, wherein the position controller is configured to balance the passively controlled forces acting on the rotor.

62. The pump apparatus of claim 58, wherein the rotor position controller is a virtual zero power controller.

63. A method of positioning a magnetically suspended rotor in a pump apparatus, the pump apparatus comprising at least one permanent magnet, at least one electro magnet, a single axial rotor position sensor, and a rotor position controller, comprising:

measuring and storing the displacement of the rotor in a plurality of positions to produce a plurality of displacement outputs;

estimating a sensor offset using the displacement outputs;

adjusting the displacement output by the estimated sensor offset to create an adjusted displacement output;

inputting the adjusted displacement output into the rotor position controller configured to determine the point of substantial axial equilibrium of the rotor; and converting the output of the rotor position controller into a force for positioning the rotor.

* * * * *

UNITED STATES PATENT AND TRADEMARK OFFICE
CERTIFICATE OF CORRECTION

PATENT NO. : 6,879,126 B2
DATED : April 12, 2005
INVENTOR(S) : Brad E. Paden et al.

It is certified that error appears in the above-identified patent and that said Letters Patent is hereby corrected as shown below:

Title page,
Item [56], References Cited, U.S. PATENT DOCUMENTS, please delete "4,806,835" and replace it with -- 4,808,835 --.

Column 4,
Line 37, please delete "maybe" and replace it with -- may be --.

Column 7,
Line 5, please delete "covert" and replace it with -- convert --.

Column 13,
Line 27, please delete "may" and replace it with -- may be --.

Column 14,
Line 15, please delete "an" and replace it with -- and --.

Signed and Sealed this

Sixteenth Day of August, 2005

JON W. DUDAS
*Director of the United States Patent and Trademark Office*